US012763510B2

(12) United States Patent
Siwek et al.

(10) Patent No.: US 12,763,510 B2
(45) Date of Patent: Oct. 13, 2026

(54) HIGH-SPEED DATA CONNECTOR ASSEMBLY

(71) Applicant: Aptiv Technologies AG, Schaffhausen (CH)

(72) Inventors: Bartlomiej Siwek, Brzezinka (PL); Karthikeyan Babu, Chennai (IN); Gert Droesbeke, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 360 days.

(21) Appl. No.: 18/656,896

(22) Filed: May 7, 2024

(65) Prior Publication Data

US 2024/0380155 A1 Nov. 14, 2024

(30) Foreign Application Priority Data

May 10, 2023 (EP) .................................... 23172632

(51) Int. Cl.
*H01R 13/506* (2006.01)
*H01R 13/514* (2006.01)
*H01R 13/516* (2006.01)

(52) U.S. Cl.
CPC ......... *H01R 13/506* (2013.01); *H01R 13/514* (2013.01); *H01R 13/516* (2013.01)

(58) Field of Classification Search
CPC ... H01R 13/506; H01R 13/514; H01R 13/516
USPC ......................................... 439/701, 687, 696
See application file for complete search history.

(56) References Cited

U.S. PATENT DOCUMENTS 6,168,476 B1 * 1/2001 Yang .................... H01R 13/506 439/352
7,396,251 B2 * 7/2008 Kuo ..................... H01R 13/562 439/457
10,305,202 B2 * 5/2019 Maesoba ............ H01R 13/6477
11,637,405 B2 * 4/2023 Droesbeke ............. H01R 43/04 439/607.41
12,308,556 B2 * 5/2025 Zou ...................... H01R 13/424
(Continued)

FOREIGN PATENT DOCUMENTS

DE 102014004301 A1 10/2015
DE 102018001227 A1 9/2018
(Continued)

OTHER PUBLICATIONS

"Extended European Search Report for Application No. 23172632. 4"; European Patent Office; mailed on Oct. 10, 2023; 5 Pages.

*Primary Examiner* — Gary F Paumen
(74) *Attorney, Agent, or Firm* — Billion & Armitage

(57) ABSTRACT

A high-speed data connector assembly may include a first insulating half shell having at least two clamping receptacles, at least two electrical terminals inserted in the clamping receptacles, a second insulating half shell complementary to the first half shell, snap means configured to snap the first insulating half shell onto the second insulating half shell in a first direction while still allowing a shifting of the second insulating half shell relative to the first insulating half shell in a second direction transverse to the first direction, and locking means configured to lock the first insulating half shell and the second insulating half shell against a movement in the second direction.

16 Claims, 12 Drawing Sheets

(56) References Cited

U.S. PATENT DOCUMENTS

| | | | | |
|---|---|---|---|---|
| 2001/0046809 | A1* | 11/2001 | Chiran | H01R 13/6593 439/607.48 |
| 2004/0014368 | A1* | 1/2004 | Kluempke | H01R 13/514 439/687 |
| 2022/0393387 | A1 | 12/2022 | Zou et al. | |

FOREIGN PATENT DOCUMENTS

| | | | |
|---|---|---|---|
| EP | 3783751 | A1 | 2/2021 |
| FR | 2952761 | A1 | 5/2011 |

* cited by examiner

HIGH-SPEED DATA CONNECTOR ASSEMBLY

CROSS-REFERENCE TO RELATED APPLICATION

This application claims the benefit of and priority to European Patent Application No. 23172632.4 titled "High-Speed Data Connector Assembly" filed on May 10, 2023, the contents of which are incorporated by reference herein.

TECHNICAL FIELD

The present disclosure relates to a high-speed data connector assembly and a method for assembling the high-speed data connector assembly.

BACKGROUND

Examples of high-speed data connector assemblies for differential pair signal transmission are sold by a company called "Rosenberger Hochfrequenztechnik GmbH & Co. KG" under the trademark H-MTD®-High-Speed Modular Twisted-Pair Data.

Applications for such high-speed data connectors are 4K camera systems, autonomous driving, radar, lidar, high resolution displays and rear seat entertainment. Versions of such connectors are designed to operate at frequencies up to 20 GHz while having a small package size.

In such high-speed applications, every tenth of a millimeter of the interconnection channel and of the signal connectors should be within a certain data transmission (differential) impedance bandwidth (typically 100±5Ω) and should be matched to preceding and succeeding sections. To this end, in each of these sections, metal portions of an inner contact or signal contact and an outer contact or shielding, insulating material of an insulating element and any air gaps should be balanced in size and position with respect to each other. There is also a need for these components to meet other non-signal-integrity requirements, in particular mechanical requirements. For example, it has to be ensured that the high-speed data connector assembly will be securely closed during assembly and remains securely closed during operation. In particular, the closure has to be resistant to any vibrations. To achieve a secure closure of the high-speed data connector assembly, an easy and trustable assembling process has to be provided.

Accordingly, there is a need for a high-speed data connector assembly that is easy and secure to assemble and that provides a secure closure during operation.

SUMMARY

In one aspect, the present disclosure is directed at a high-speed data connector assembly, wherein the connector assembly comprises a first insulating half shell having at least two clamping receptacles, at least two electrical terminals inserted in the clamping receptacles, a second insulating half shell complementary to the first half shell, snap means configured to snap the first insulating half shell onto the second insulating half shell in a first direction while still allowing a shifting of the second insulating half shell relative to the first insulating half shell in a second direction transverse to the first direction, and locking means configured to lock the first insulating half shell and the second insulating half shell against a movement in the second direction.

The high-speed data connector assembly described herein may be a female connector assembly, i.e., the electrical terminals may be female signal contacts. Each of the at least two electrical terminals may have a funnel-shaped end section allowing for pin movement, i.e., allowing insertion of a male signal contact pin.

The first insulating half shell and the second insulating half shell entirely enclose the electrical terminals in an assembled state of the connector assembly, wherein the first insulating half shell and the second insulating half shell are securely locked in the assembled state. Further, the first insulating half shell and the second insulating half shell are configured to isolate the electrical terminals from each other. Thus, the first insulating half shell and the second insulating half shell are manufactured from an insulating material, e.g., plastic. Each of the at least two clamping receptacles of the first insulating half shell is configured to receive one of the at least two electrical terminals. In particular, the clamping receptacles are configured such that the electrical terminals can be clamped into the clamping receptacles. Each of the clamping receptacles may comprise a tube-like section and two walls extending from the tube-like section and forming an opening. The opening is configured to receive the electrical terminal and the walls are configured to enclose the electrical terminal when it is inserted into the clamping receptacle.

The first insulating half shell and the second insulating half shell can be connected using the snap means and the locking means, wherein each of the first insulating half shell and the second insulating half shell comprises snap means and locking means. The snap means of the first insulating half shell and the snap means of the second insulating half shell may be complementary, i.e., the snap means of the first insulating half shell may be configured to engage with the snap means of the second insulating half shell to snap the first insulating half shell onto the second insulating half shell in the first direction. The locking means of the first insulating half shell and the locking means of the second insulating half shell may be complementary, i.e. the locking means of the first insulating half shell may be configured to engage with the locking means of the second insulating half shell to lock the first insulating half shell and the second insulating half shell in the against a movement in the second direction.

The second direction may be an axial direction of the electrical terminals when inserted in the clamping receptacles of the first insulating half shell. Thus, a movement or a shifting of the second insulating half shell relative to the first insulating half shell in the second direction may be a movement or a shifting of the second insulating half shell in the axial direction of the electrical terminals. The first direction is perpendicular or transverse to the second direction. The electrical terminals may be inserted into the clamping receptacles of the first insulating half shell in the first direction, i.e., in the same direction as the first insulating half shell is snapped onto the second insulating half shell.

According to an embodiment, the snap means are located at an outer circumferential wall of the first insulating half shell and the second insulating half shell. The snap means of the first insulating half shell are located at an outer surface of the first insulating half shell. The snap means of the second insulating half shell are located at an outer surface of the second insulating half shell. Thus, after assembly of the first insulating half shell and the second insulating half shell, it can be seen from the outside whether the first insulating half shell has been correctly snapped onto the second insulating half shell.

According to an embodiment, the snap means comprises at least one hook and at least one ledge configured to define an overlap between the at least one hook and the at least one ledge when snapped in place, wherein the overlap increases when shifting the second insulating half shell relative to the first insulating half shell in the second direction. The at least one hook and the at least one ledge may be elongated in the second direction, i.e., the at least one hook and the at least one ledge may extend in the second direction. The at least one hook may be the snap means of the second insulating half shell. The at least one ledge may be the snap means of the first insulating half shell. The at least one ledge of the first insulating half shell and the at least one hook of the second insulating half shell may be located complementary on the outer surface of the first insulating half shell and the outer surface of the second insulating half shell such that the at least one hook may engage to the at least one ledge when the first insulting half shell is snapped onto the second insulating half shell.

The first insulating half shell may comprise two oppositely arranged ledges at the outer surface of the first insulating half shell. The second insulating half shell may comprise two oppositely arranged hooks at the outer surface of the second insulating half shell. The first insulating half shell may preferably comprise four ledges, two of the four ledges being arranged opposite each other. The second insulating half shell may preferably comprise four hooks, two of the four hooks being arranged opposite each other. Two oppositely arranged ledges are located at a distance from the other two oppositely arranged ledges in the second direction. Two oppositely arranged hooks are located at a distance from the other two oppositely arranged hooks in the second direction. A secure snapping of the first insulating half shell onto the second insulating half shell can be achieved by multiple snap means arranged at separate locations on the outer surface of the first insulating half shell and the second insulating half shell.

According to this embodiment, the at least one hook comprises a first section and a second section connected by means of a sliding ramp. The first section of the at least one hook and the second section of the at least one hook may comprise a different elongation in a third direction, wherein the third direction is perpendicular to the first direction and to the second direction. The sliding ramp arranged between the first section and the second section of the at least one hook connects the first section and the second section. The sliding ramp is configured to enable a movement of the second insulating half shell relative to the first insulating half shell in the second direction from a pre-locked state of the connector assembly into the assembled state of the connector assembly as will be described below. The different elongation of the first section and the second section may allow to increase an overlap between the at least one hook and the at least one ledge when the second insulating half shell is shifted relative to the first insulating half shell in the second direction. A minimum overlap between the at least one hook of the second insulating half shell and the at least one ledge of the first insulating half shell in the pre-locked state may be necessary in order to generate sufficient retention force between the first insulating half shell and the second insulating half shell and on the other hand not to cause extended stress during an assembly process of the first insulating half shell and the second insulating half shell. In addition, the minimum overlap between the at least one hook of the second insulating half shell and the at least one ledge of the first insulating half shell in the pre-locked state may allow the first insulating half shell and the second insulating half shell to separate from one another. After shifting the second insulating half shell relative to the first insulating half shell in the second direction into the assembled state, i.e., a locked position, the overlap may be sufficient to have proper retention between the first insulating half shell and the second insulating half shell. While shifting the second insulating half shell relative to the first insulating half shell in the second direction, no further deflection of the at least one hook in a radial direction may be required. Thus, a connection between the first insulating half shell and the second insulating half shell in the assembled state is safe and stable.

According to an embodiment, the locking means are integrated in the at least one hook. Thus, the at least one hook may be configured to snap the first insulating half shell onto the second insulating half shell in the first direction while still allowing a shifting of the second insulating half shell relative to the first insulating half shell in the second direction transverse to the first direction, and the at least one hook may be configured to lock the first insulating half shell and the second insulating half shell against a movement in the second direction. Snap means and locking means integrated in the at least one hook may allow a compact construction of the high-speed data connector assembly.

According to an embodiment, the locking means are located at an outer circumferential wall of the first insulating half shell and the second insulating half shell. The locking means of the first insulating half shell are located at an outer surface of the first insulating half shell. The locking means of the second insulating half shell are located at an outer surface of the second insulating half shell. Thus, after assembly of the first insulating half shell and the second insulating half shell, it can be seen from the outside whether the first insulating half shell and the second insulating half shell has been correctly locked against a movement in the second direction.

According to an embodiment, electrical conductors are connected to the electrical terminals and the first insulating half shell and/or the second insulating half shell comprise a rib configured to separate the electrical conductors, wherein the rib substantially completely fills a space between the two electrical conductors in an assembled state of the high-speed data connector assembly. The electrical conductors may be uninsulated wires of a cable connected to the high-speed data connector assembly. The electrical conductors may be connected to the electrical terminals by crimping, welding, soldering, or the like.

The rib may be of an insulating material, preferably of the same material as the first insulating half shell and/or the second insulating half shell. The rib may protrude from an inner surface of the first insulating half shell and/or the second insulating half shell in a direction parallel to the first direction. The rib may be configured to balance metal portions of the electrical terminals and insulating material of the first insulating half shell and/or the second insulating half shell and any space or air gaps in size and position with respect to each other. In particular, the space between the two electrical conductors is completely filled by the rib in that the rib of the second insulating half shell is aligned with the rib of the first insulating half shell when the high-speed data connector assembly is in the assembled state. Shifting the second insulating half shell relative to the first insulating half shell in the second direction may shift the rib of the second insulating half shell relative to the rib of the first insulating half shell. A substantially completely filled space between the two electrical conductors may improve data transmission.

According to an embodiment, each of the at least two electrical terminals comprises a fixing element configured to fix the respective electrical terminal in the first insulating half shell against a movement in the second direction. The fixing element may also be configured to reduce or to fix the respective electrical terminal in the first insulating half shell against a rotational movement around an axis in the second direction. The fixing element may also be configured to compensate for different crimping diameters of the electrical conductors. The fixing element may be configured to be the same for a plurality of different electrical terminals or to have the same dimensions for a plurality of different electrical terminals. In other words, the electrical terminals, in particular a crimp portion of the electrical terminals, may have varied sizes depending on a size of a cable or depending on the crimping diameter of the electrical conductors connected to the electrical terminals, wherein the size of the fixing element is constant for each of the different electrical terminals. By means of the fixing element, the electrical terminals are securely located in the first insulating half shell. Thus, for example, an optimum electrical and mechanical connection between a male signal contact guided into a corresponding female signal contact, i.e., into the corresponding electrical terminal of the high-speed data connector assembly, can be achieved for high data transmission.

According to this embodiment, each of the at least two clamping receptacles and/or each of the at least two electrical terminals and/or each of the fixing elements comprise guiding surfaces configured to align the electrical terminals and the fixing elements in the clamping receptacles. The guiding surfaces of the at least two clamping receptacles may be inner surfaces of the respective two walls extending from the tube-like section of each clamping receptacle. The guiding surfaces of the at least two electrical terminals and/or the fixing elements may be an outer surface of the at least two electrical terminals and/or the fixing elements. An alignment of the electrical terminal and the fixing elements in the clamping receptacles may be provided in that the outer surfaces of the electrical terminal and the fixing elements adapt to the inner surfaces of the clamping receptacles when the electrical terminals and the fixing elements are inserted in the clamping receptacles. This may facilitate an assembly of the high-speed data connector assembly since the electrical terminals can be inserted at an angle, for example between 0 and 40 degrees, to the respective clamping receptacles while self-aligning during assembly.

According to an embodiment, the second insulating half shell comprises at least two protrusions arranged at an inner surface of the second insulating half shell and configured to press the fixing elements, and thus the at least two electrical terminals, into the at least two clamping receptacles when the second insulating half shell is moved in the first direction. The two protrusions may be of the same insulating material as the second insulating half shell. Further, the two protrusions may be located at the inner surface of the second insulating half shell corresponding to the respective fixing element of the electrical terminal such that each of the two protrusions can press the respective fixing element, and thus the respective electrical terminal, into the clamping receptacle. Thus, the electrical terminals may be inserted into the clamping receptacles of the first insulating half shell automatically by means of the protrusions when the first insulating half shell is snapped onto the second insulating half shell in the first direction. The protrusions may also assist in aligning the electrical terminals in the clamping receptacles.

According to an embodiment, the second insulating half shell comprises at least one wedge arranged at the inner surface of the second insulating half shell and configured to press at least one wall of each clamping receptacle in a direction towards the electrical terminal inserted in the respective clamping receptacle when the second insulating half shell is moved in the first direction. The at least one wedge may be of the same insulating material as the second insulating half shell. Further, the at least one wedge may be located at the inner surface of the second insulating half shell at a corresponding location to a space between the at least two clamping receptacles of the first insulating half shell such that the at least one wedge can press against at least one wall of each clamping receptacle in a direction towards the electrical terminal when the second insulating half shell is snapped onto the first insulating half shell. Thus, the electrical terminals may further be fixed in the clamping receptacles by pressing the at least one wedge against the walls of the clamping receptacles and/or by pressing the protrusions against the fixing element of the respective electrical terminal.

According to an embodiment, each of the fixing elements comprises at least one clamping element arranged on an outer surface of each of the fixing elements and configured to fix each of the fixing elements, and thus each of the respective electrical terminal in the respective clamping receptacle. The at least one clamping element may protrude in the third direction, i.e., in a direction transverse to the second direction and perpendicular to the first direction. The at least one clamping element of each of the fixing elements is configured to clamp the fixing element against the walls and/or the tube-like section of the respective clamping receptacle. The at least one clamping element may form an outer metal edge of the respective fixing element. Further, the at least one clamping element may provide more grip and retention of the fixing element to the respective clamping receptacle.

According to an embodiment, the at least one clamping element comprises a bent tongue or a bent edge. The bent tongue or the bent edge may comprise hooking or sharp features. The fixing element may comprise two clamping elements, wherein the two clamping elements are oppositely arranged at an outer surface of the fixing element. In another embodiment, the fixing element may comprise four clamping elements, wherein respective two clamping elements are oppositely arranged at an outer front edge and/or an outer back edge of the fixing element.

According to an embodiment, the high-speed data connector assembly comprises at least four snap means and at least six locking means.

In another aspect, the present disclosure is directed at a method for assembling the high-speed data connector assembly according to any of the preceding claims, comprising: clamping the at least two electrical terminals into the at least two clamping receptacles of the first insulating half shell; snapping the first insulating half shell onto the second insulating half shell in the first direction using the snap means; shifting the second insulating half shell relative to the first insulating half shell in the second direction transverse to the first direction; and locking the first insulating half shell and the second insulating half shell against a movement in the second direction using the locking means.

BRIEF DESCRIPTION OF THE DRAWINGS

The present invention is now described, by way of example with reference to the accompanying drawings, in which.

DETAILED DESCRIPTION

Problems of assembling signal contacts (electrical terminals) in a connector assembly and cable fixation to the connector assembly when, for example, assembled on full auto line may be solved by a first insulating half shell, a second insulating half shell and electrical terminals having fixation features as described herein. The electrical terminals, together with crimped wires, may be assembled into the first insulating half shell and the second insulating half shell. In order to lower the cost of labor and production, both half shells may be clamped together without using any welding, jointing or any other additional process. The first insulating half shell and the second insulating half shell may be fixed by shapes on portions of the first insulating half shell and by shapes on portions of the second insulating half shell, wherein the shapes engage during an assembly process of the connector assembly. The shapes may be snap means and/or locking means as described herein.

The assembly process is done in two steps. The first assembly step is a pre-assembly stage, wherein the first insulating half shell is placed on the second insulating half shell perpendicular to a wire direction. The second assembly step is an assembly stage, wherein the second insulating half shell is slid relative to the first insulating half shell along the wire direction. During this move clamping shapes on portions of the first insulating half shell slide on clamping shapes on portions of the second insulating half shell. The characteristic for this design is that an overlapping between the clamping shapes of the first insulating half shell and the second insulating half shell at the first assembly step is relatively small. However, the overlapping becomes significant during the second assembly step of the assembly process.

Additionally, on the same portions of the first insulating half shell and the second insulating half shell, where clamping shapes are placed, the features which lock the first insulating half shell to the second insulating half shell against a movement along the wire direction may be placed. Thus, a strong and robust connection between the first insulating half shell and the second insulating half shell may be achieved.

Figure 1:
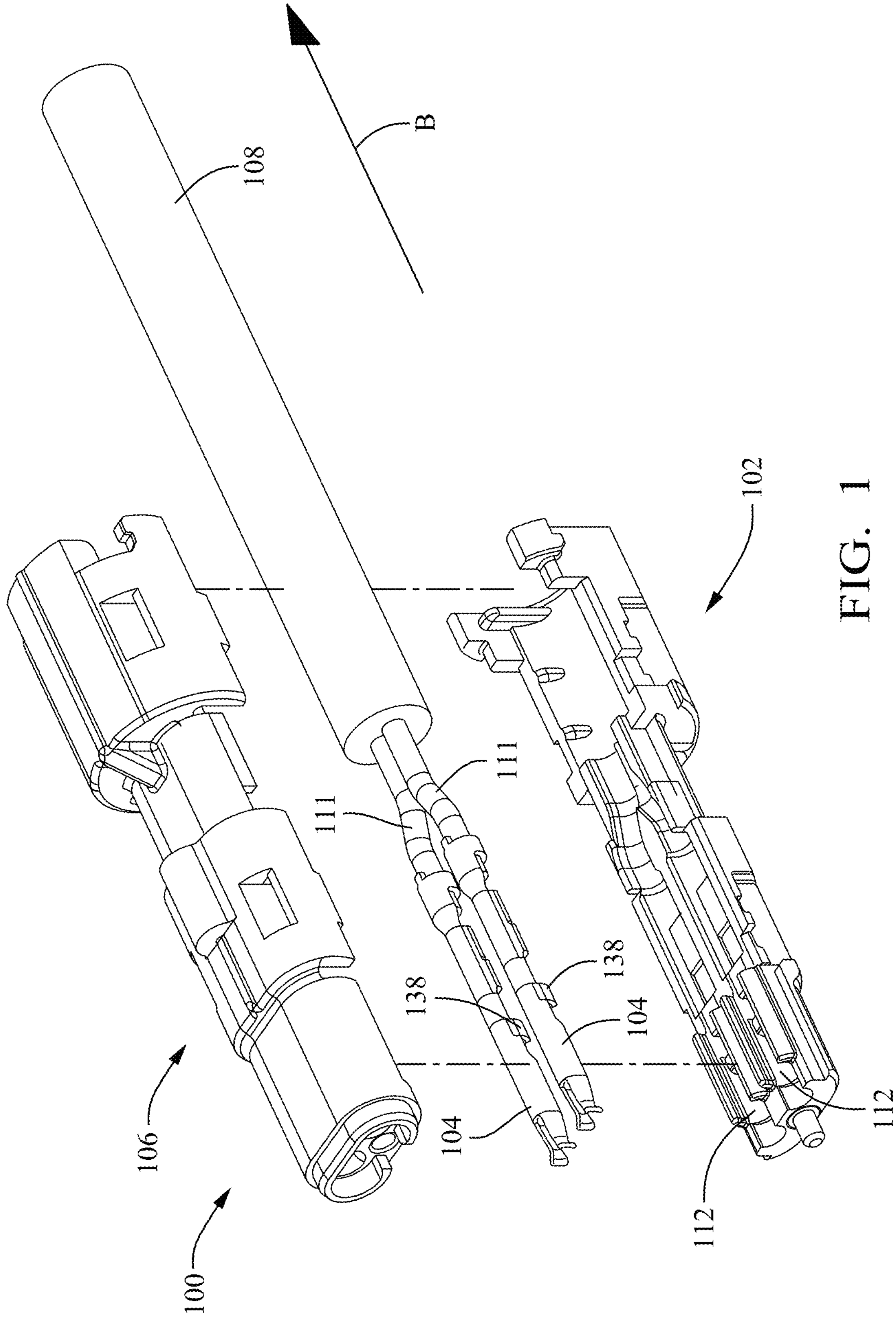
FIG. 1 is an exploded view of a high-speed data connector assembly according to an embodiment.

FIG. 1 depicts an exploded view of a high-speed data connector assembly 100 according to an embodiment of the present disclosure. The connector assembly 100, in particular a female connector, includes a first insulating half shell 102, a second insulating half shell 106 and a pair of electrical terminals 104. The first insulating half shell 102 includes two clamping receptacles 112 configured to receive the two electrical terminals 104, wherein each of the two electrical terminals 104 may be pressed into a respective clamping receptacle 112 of the first insulating half shell 102. The two clamping receptacles 112 and the two electrical terminals 104 are elongated in an axial direction B. The second insulating half shell 106 is complementary to the first insulating half shell 102, i.e., the first insulating half shell 102 and the second insulating half shell 106 may be snapped together to form a shell that encloses the two electrical terminals 104 entirely in an assembled state of the connector assembly 100. Each of the two electrical terminals 104 may include a fixing element 138. The fixing element 138 may be configured to secure the respective electrical terminal 104 in the respective clamping receptacle 112 of the first insulating half shell 102 against a movement in the axial direction B when the respective electrical terminal 104 is inserted in the respective clamping receptacle 112. Wires 111 of a cable 108 are connected to the electrical terminals 104, in particular, electrical conductors 110 (not shown in FIG. 1) of the wires 111 are connected via crimping to the electrical terminals 104.

Figure 2A:
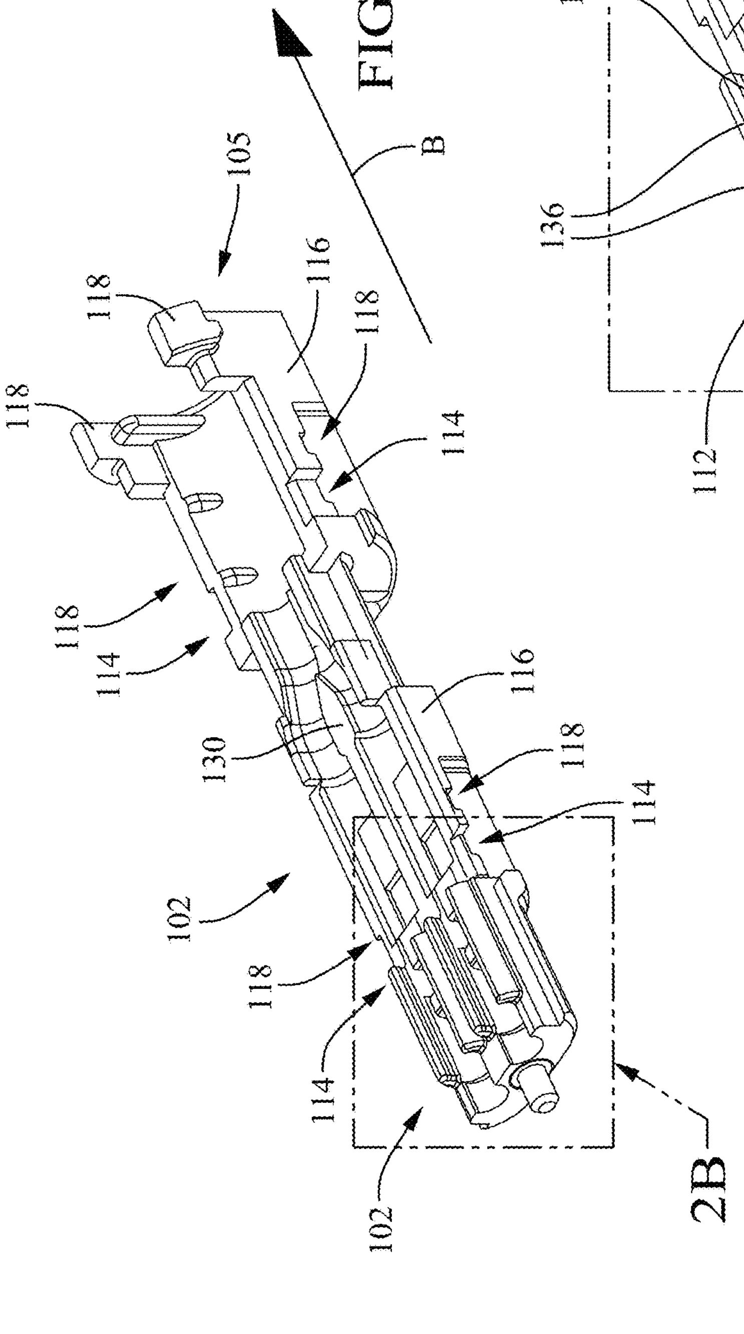
FIG. 2A is an isometric view of a first insulating half shell according to an embodiment.
Figure 2B:
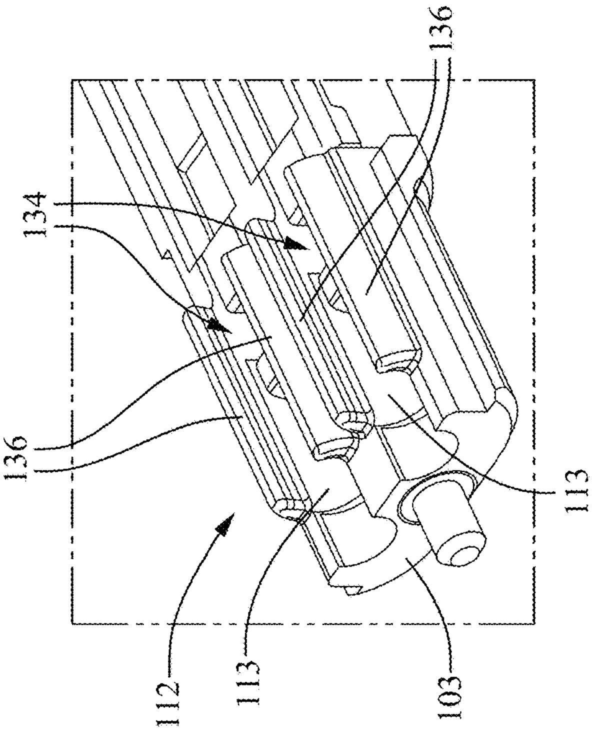
FIG. 2B is an enlarged isometric view of a portion of the first insulating half shell of FIG. 2A according to an embodiment.

FIGS. 2A and 2B show isometric views of a first insulating half shell 102 according to an embodiment. The first insulating half shell 102 may include a first portion 103 and a second portion 105. The first portion 103 of the first insulating half shell 102 includes the two clamping receptacles 112. Each of the two clamping receptacles 112 includes a groove 113, wherein an elongated wall 136 protrudes at each side of the respective groove 113. The two elongated walls 136 of the respective clamping receptacle 112 form an opening to receive the respective electrical terminal 104. Each of the elongated walls 136 is curved in a radial direction such that the opening is smaller than a diameter of the electrical terminal 104. Further, each of the clamping receptacles 112 includes a recess 134 configured to receive the fixing element 138 (see FIG. 1) of the respective electrical terminal 104.

The first insulating half shell 102 further includes snap means 114 and locking means 118. The snap means 114 and the locking means 118 are located at an outer circumferential wall 116 of the first insulating half shell 102. There may be four snap means 114 and six locking means 118 arranged at the first insulating half shell 102. The snap means 114 of the first insulating half shell 102 include at least one ledge 121 (see FIG. 6B). The at least one ledge 121 extends in the axial direction B of the first insulating half shell 102.

The first portion 103 of the first insulating half shell 102 includes two snap means 114 and two locking means 118. The respective two snap means 114 are oppositely arranged at the outer circumferential wall 116 of the first portion 103. The respective two locking means 118 are also oppositely arranged at the outer circumferential wall 116 of the first portion 103. The two locking means 118 of the first portion 103 are arranged in the axial direction B adjacent to the two snap means 114 of the first portion 103. The second portion 105 of the first insulating half shell 102 includes two snap means 114 and four locking means 118. The respective two snap means 114 are oppositely arranged at the outer circumferential wall 116 of the second portion 105. The respective two locking means 118 are also oppositely arranged at the outer circumferential wall 116 of the second portion 105, wherein the two other locking means 118 of the second portion 105 are arranged in the axial direction B adjacent to the two snap means 114 of the second portion 105 and the two other locking means 118 are arranged at an end of the second portion 105 of the first insulating half shell 102.

The first insulating half shell 102 further includes a triangular rib 130. The rib 130 is located between the first portion 103 of the first insulating half shell 102 and the second portion 105 of the first insulating half shell 102 at an inner surface of the first insulating half shell 102. The rib 130 will be described in more detail below.

Figure 3A:
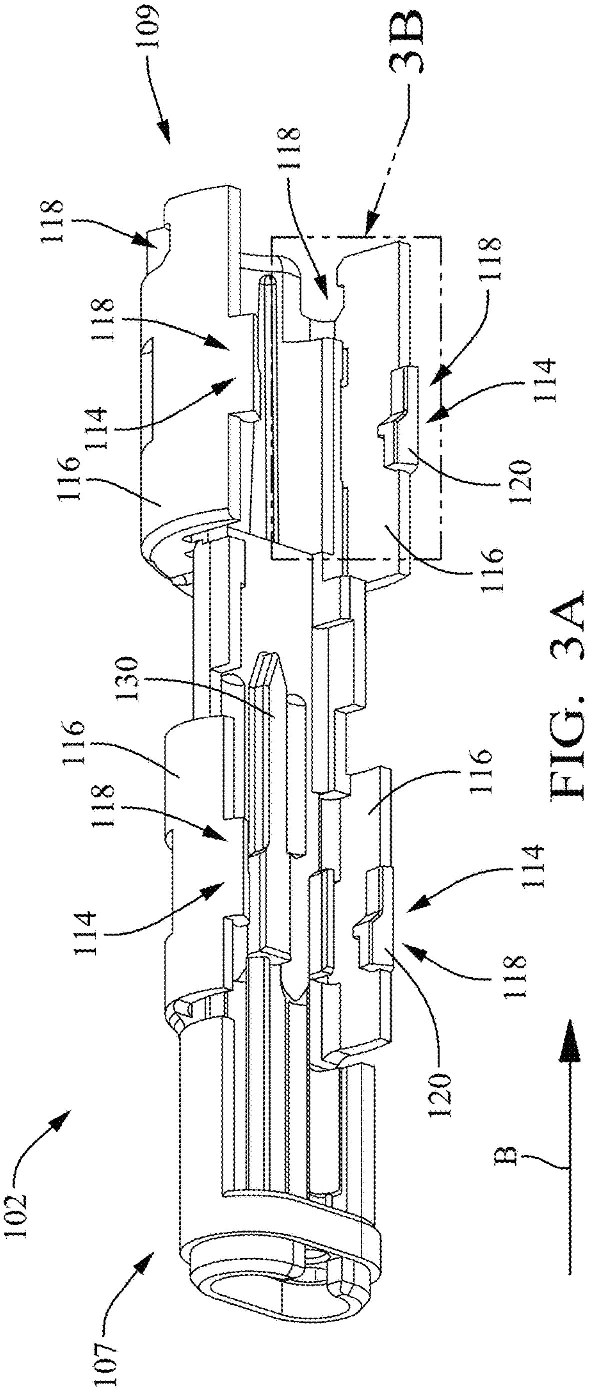
FIG. 3A is an isometric view of a second insulating half shell according to an embodiment.
Figure 3B:
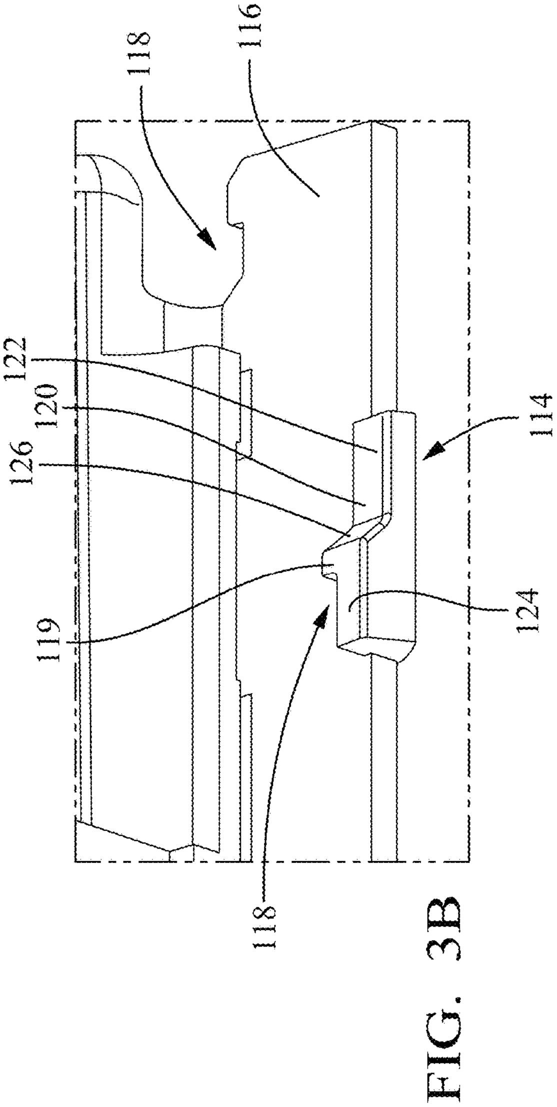
FIG. 3B is an enlarged isometric view of a portion of the second insulating half shell of FIG. 3A according to an embodiment.

FIGS. 3A and 3B show isometric views of the second insulating half shell 106 according to an embodiment. The second insulating half shell 106 may include a first portion 107 and a second portion 109. The second insulating half shell 106 includes snap means 114 and locking means 118. The snap means 114 and the locking means 118 are located at an outer circumferential wall 116 of the second insulating half shell 106. There may be four snap means 114 and six locking means 118 arranged at the second insulating half shell 106. The snap means 114 and the locking means 118 of the second insulating half shell 106 may be complementary to the snap means 114 and the locking means 118 of the first insulating half shell 102.

The first portion 107 of the second insulating half shell 106 includes two snap means 114 and two locking means 118. The respective two snap means 114 are oppositely arranged at the outer circumferential wall 116 of the first portion 107 of the second insulating half shell 106. The respective two locking means 118 are also oppositely arranged at the outer circumferential wall 116 of the first portion 107 of the second insulating half shell 106. The second portion 109 of the second insulating half shell 106 includes two snap means 114 and four locking means 118. The respective two snap means 114 are oppositely arranged at the outer circumferential wall 116 of the second portion 109 of the second insulating half shell 106. The respective two locking means 118 are also oppositely arranged at the outer circumferential wall 116 of the second portion 109 of the second insulating half shell 106. The two other locking means 118 of the second portion 109 are arranged at an end of the second portion 109 of the second insulating half shell 106.

The snap means 114 of the second insulating half shell 106 includes a hook 120. The hook 120 includes a first section 122 and a second section 124 connected by means of a sliding ramp 126. Some of the locking means 118 of the second insulating half shell 106 may be integrated in the hook 120 of the snap means 114 of the second insulating half shell 106. In particular, each of the four snap means 114 of the second insulating half shell 106 includes a respective locking means 118. The locking means 118 of the respective snap means 114 may be a bulge 119 at an edge of the second section 124 of the hook 120. The hook 120 is configured to hook in the at least one ledge 121 (see FIG. 6B) of the first insulating half shell 102 to lock the first insulating half shell 102 to the second insulating half shell 106 in a first direction A (see FIG. 4A).

The second insulating half shell 106 further includes a triangular rib 130. The rib 130 is located between the first portion 107 of the second insulating half shell 106 and the second portion 109 of the second insulating half shell 106 at an inner surface of the second insulating half shell 106. The rib 130 of the second insulating half shell 106 will be described in more detail together with the rib 130 of the first insulating half shell 102 further below.

Figure 4A:
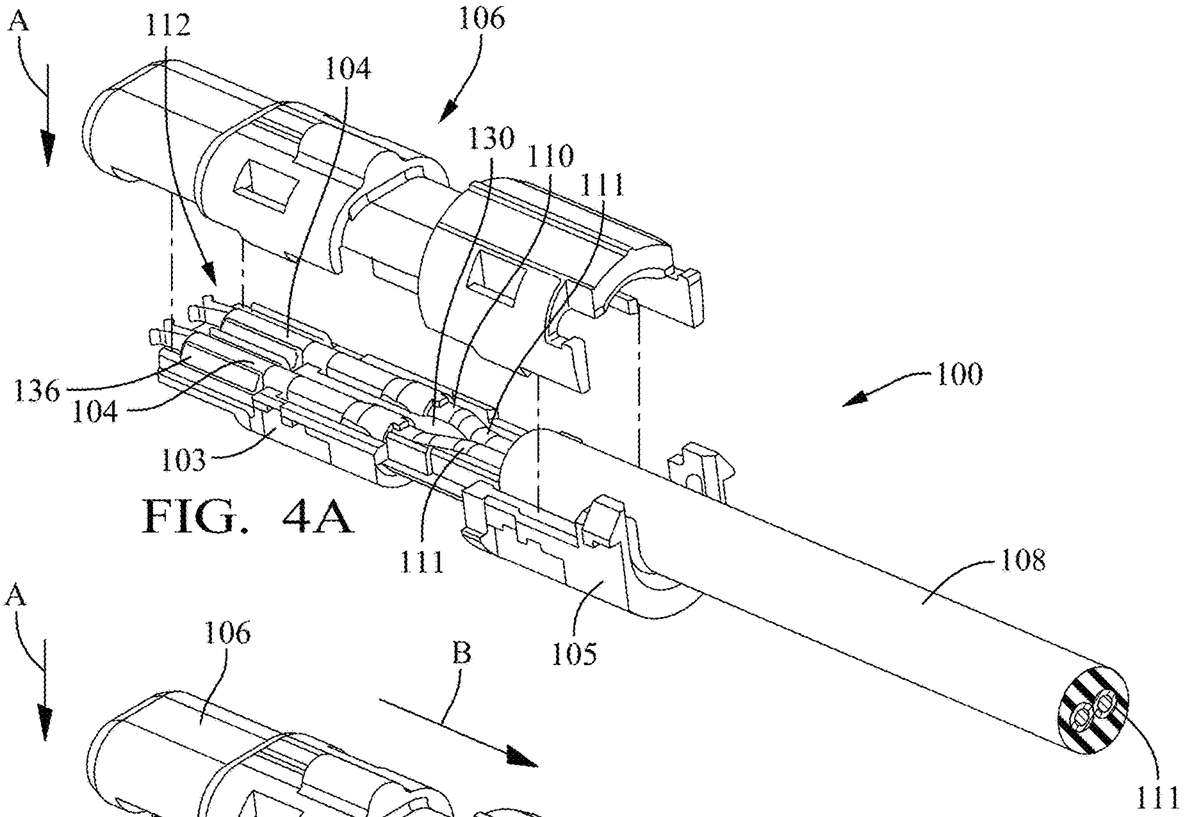
FIG. 4A is an isometric view of the high-speed data connector assembly in a pre-assembled state according to an embodiment.

FIG. 4A shows an isometric view of the high-speed data connector assembly 100 in a pre-assembled state according to an embodiment. A cable 108 including a pair of twisted wires 111 is inserted into the first insulating half shell 102 of the high-speed data connector assembly 100. One end of the cable 108 is clamped into the second portion 105 of the first insulating half shell 102. Each of the wires 111 is covered by a wire insulating. Each of the wires 111 includes an electrical conductor 110 that is connected to the respective electrical terminal 104. The two electrical terminals 104 are inserted in the clamping receptacles 112 of the first portion 103 of the first insulating half shell 102. The walls 136 of the clamping receptacles 112 hold the electrical terminals 104 in the clamping receptacles 112. The rib 130 of the first insulating half shell 102 is configured to separate the two electrical conductors 110, in particular the two isolated wires 111. The rib 130 substantially completely fills a space between the two electrical conductors 110 in an assembled state of the high-speed data connector assembly 100.

The second insulating half shell 106 is not snapped on the first insulating half shell 102 in the pre-assembled state of the high-speed data connector assembly 100. The second insulating half shell 106 is moved in the first direction A to connect the second insulating half shell 106 with the first insulating half shell 102.

Figure 4B:
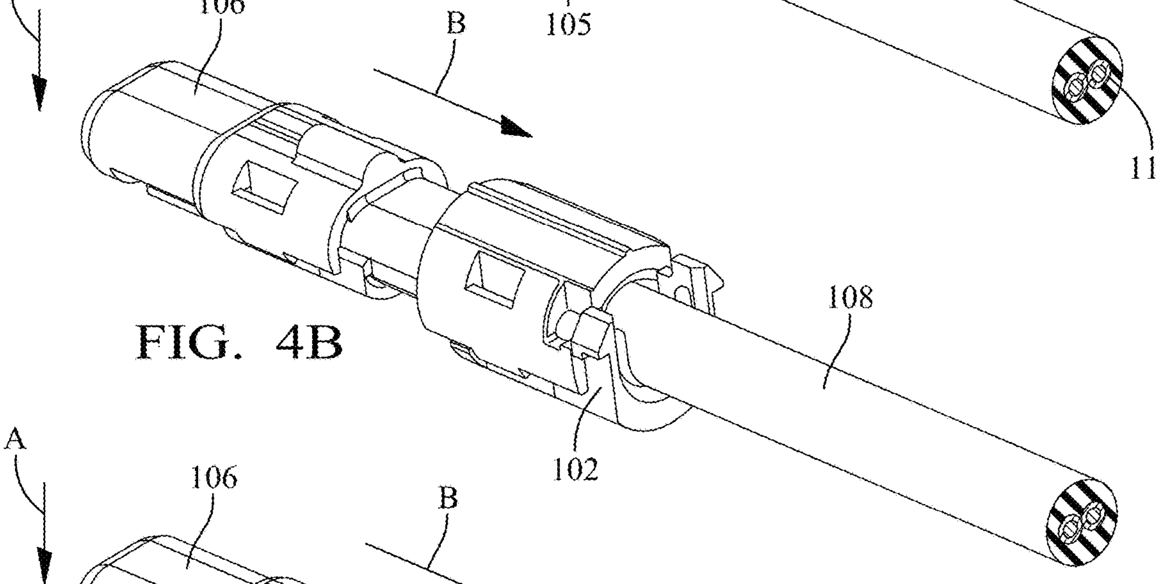
FIG. 4B is an isometric view of the high-speed data connector assembly in a pre-locked state according to an embodiment.

FIG. 4B shows an isometric view of the high-speed data connector assembly 100 in a pre-locked state according to an embodiment. After moving the second insulating half shell 106 in the first direction A, the first insulating half shell 102 is snapped onto the second insulating half shell 106 in the first direction A using the snap means 114 of the first insulating half shell 102 and the snap means 114 of the second insulating half shell 106. However, the snapping between the first insulating half shell 102 and the second insulating half shell 106 only locks a movement in the first direction A between the first insulating half shell 102 and the second insulating half shell 106 while still allowing a shifting of the second insulating half shell 106 relative to the first insulating half shell 102 in a second direction B. The second direction B is transverse to the first direction A, wherein the second direction B is the axial direction of the first insulating half shell 102 and the second insulating half shell 106. As shown in FIG. 4B, the first insulating half shell 102 and the second insulating half shell 106 are arranged axially offset in the second direction B in the pre-locked state of the high-speed data connector assembly 100.

To bring the high-speed data connector assembly 100 into an assembled state, i.e., into a final locked position of the high-speed data connector assembly 100, the second insulating half shell 106 is shifted relative to the first insulating half shell 102 in the second direction B. The triangular rib 130 of the second insulating half shell 106 (see FIG. 3A) slides in between the two wires 111 when shifting the second insulating half shell 106 relative to the first insulating half shell 102 in the second direction B. Thus, a well-controlled and specific wire routing from a pitch between the wires 111 in the cable 108 to a pitch of a connection between the electrical conductors 110 and the electrical terminals 104 within the first insulating half shell 102 and the second insulating half shell 106 is achieved. An assembly of the cable 108 to the electrical terminals 104 with crimped electrical conductors 110 within the first insulating half shell 102 is not hindered and remains easy and risk free. Also, a space around the wires 111 can be tightened in order to reduce clearances and/or tolerances which may be needed for or might come from a vertical mounting of the cable 108 with the crimped signal contacts inside the first insulating half shell 102. Drive the wires in a specific and controlled routing from the pitch in the cable 108 to the pitch of the connection between the electrical conductors 110 and the electrical terminals 104 which may be favorable for a differential impedance match and thus, for return loss and/or signal integrity. Also, there may be more freedom to select a material of the rib 130 for either differential impedance match and/or creepage distance and/or mechanical strength.

Figure 4C:
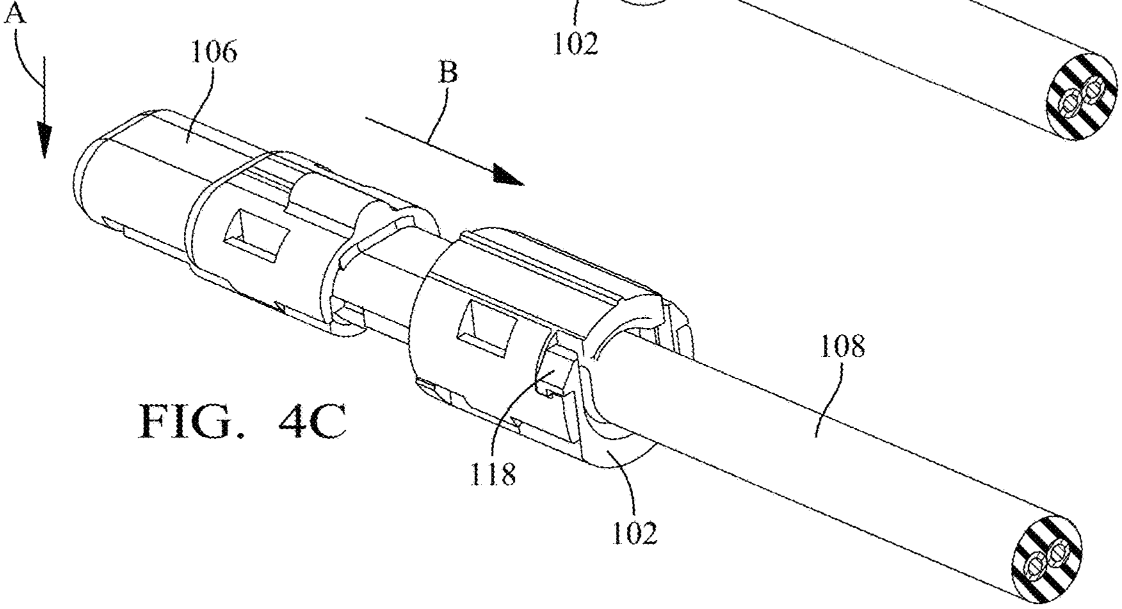
FIG. 4C is an isometric view of the high-speed data connector assembly in an assembled state according to an embodiment.

FIG. 4C shows an isometric view of the high-speed data connector assembly 100 in the assembled state according to an embodiment. In the assembled state, the locking means 118 of the first insulating half shell 102 and the locking means 118 of the second insulating half shell 106 gear into each other and lock the first insulating half shell 102 and the second insulating half shell 106 against a movement in the second direction B. Details of the snapping and the locking between the first insulating half shell 102 and the second insulating half shell 106 are described in the following. In the assembled state of the high-speed data connector assembly 100, the rib 130 of the first insulating half shell 102 and the rib 130 of the second insulating half shell 106 are aligned. The aligned rib 130 substantially completely fills a space between the two electrical conductors 110 (see FIG. 4A), in particular a space between the two wires 111 of the cable 108, in the assembled state of the high-speed data connector assembly 100.

Figure 5A:
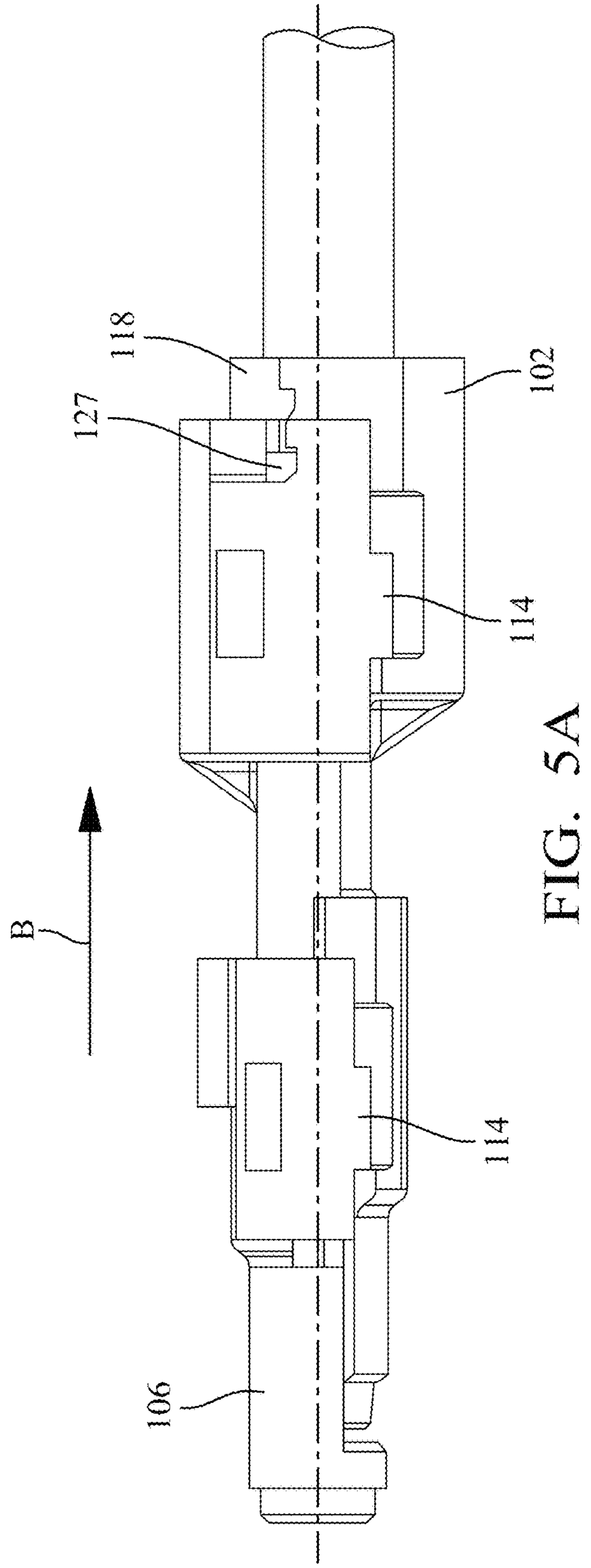
FIG. 5A is a side view of the high-speed data connector assembly in the pre-locked state of FIG. 4B according to an embodiment.

FIG. 5A shows a side view of the high-speed data connector assembly 100 in the pre-locked state of FIG. 4B. The second insulating half shell 106 is snapped onto the first insulating half shell 102 by means of the snap means 114 of the first insulating half shell 102 and the snap means 114 of the second insulating half shell 106. The second insulating half shell 106 is shiftable relative to the first insulating half shell 102 in the second direction B. Thus, the locking means 118 of the first insulating half shell 102 and the locking means 118 of the second insulating half shell 106 are not interlocked in the pre-locked state of the high-speed data connector assembly 100.

Figure 5B:
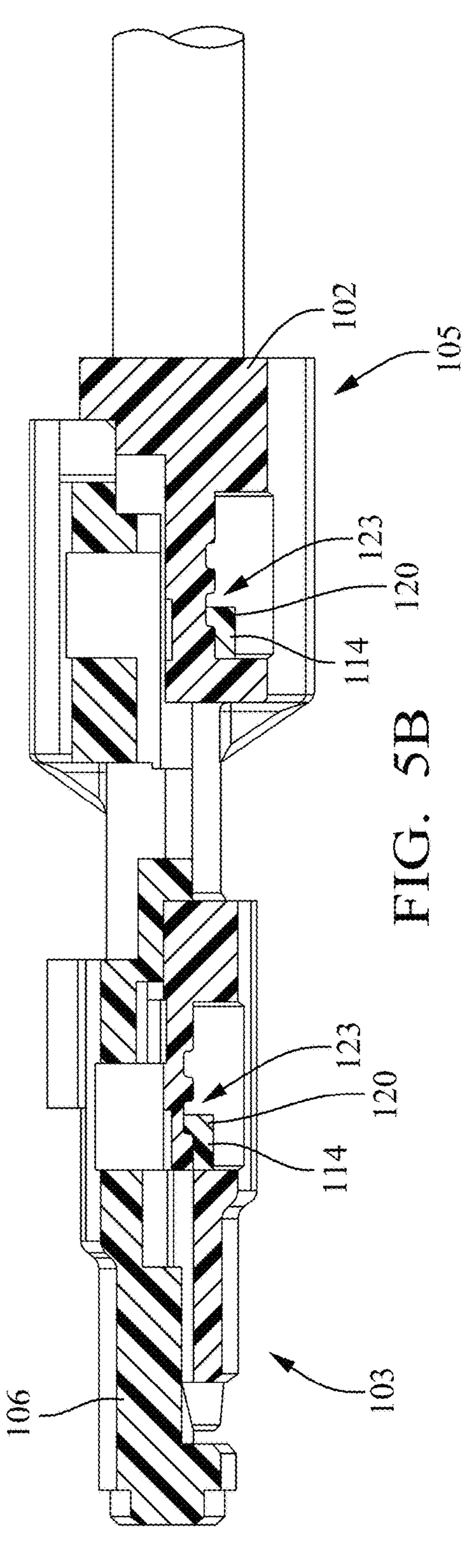
FIG. 5B is a side cross-sectional view of the high-speed data connector assembly in the pre-locked state of FIG. 4B according to an embodiment.

FIG. 5B shows a side cross-sectional view of the high-speed data connector assembly 100 in the pre-locked state of FIG. 4B. The snap means 114 of the first insulating half shell 102 and the snap means 114 of the second insulating half shell 106 are engaged. The snap means 114 of the first insulating half shell 102 includes a first gap 123. As shown in FIG. 5B, a part of the hook 120, in particular the bulge 119 of the locking means 118 (see FIG. 3A), is located in the first gap 123 of the first insulating half shell 102 in the pre-locked state of the high-speed data connector assembly 100. The snap means 114 of the first portion 103 and the snap means 114 of the second portion 105 of the first insulating half shell 102 operate similarly. More details of the snap means 114 are shown in FIG. 6A to 6C.

Figures 6A, 6B, 6C:
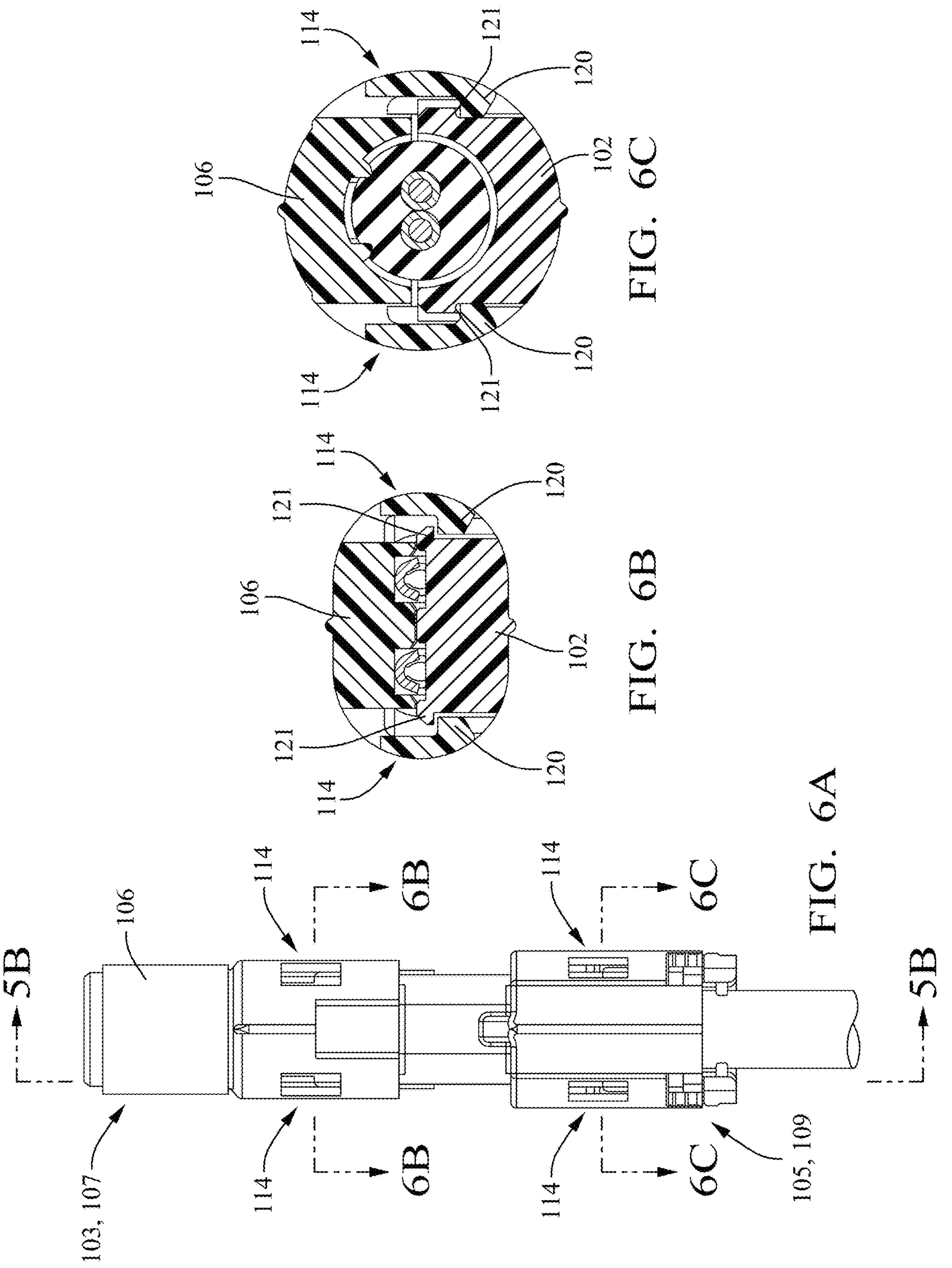
FIG. 6A is a top view of the high-speed data connector assembly in the pre-locked state of FIG. 4B according to an embodiment.
FIG. 6B is a cross-sectional view of the high-speed data connector assembly in the pre-locked state of FIG. 6A according to an embodiment.
FIG. 6C is a further cross-sectional view of the high-speed data connector assembly in the pre-locked state of FIG. 6A.

FIG. 6A shows a top view of the high-speed data connector assembly 100 in the pre-locked state of FIG. 4B. FIG. 6B shows a cross-sectional view of a sectional plane V-V passing through the snap means 114 of the first portions 103, 107 of the first insulating half shell 102 and the second insulating half shell 106, as indicated in FIG. 6A. FIG. 6C shows a cross-sectional view of a sectional plane U-U passing through the snap means 114 of the second portions 105, 109 of the first insulating half shell 102 and the second insulating half shell 106, as indicated in FIG. 6A. The hook 120 of the snap means 114 of the second insulating half shell 106 and the ledge 121 of the snap means 114 of the first insulating half shell 102 may define an overlap between the at least one hook 120 and the at least one ledge 121 when snapped in place. The overlap increases when the second insulating half shell 106 is shifted relative to the first insulating half shell 102 from the pre-locked state (see FIG. 4B) to the assembled state (see FIG. 4C) in the second direction B.

Figure 7A:
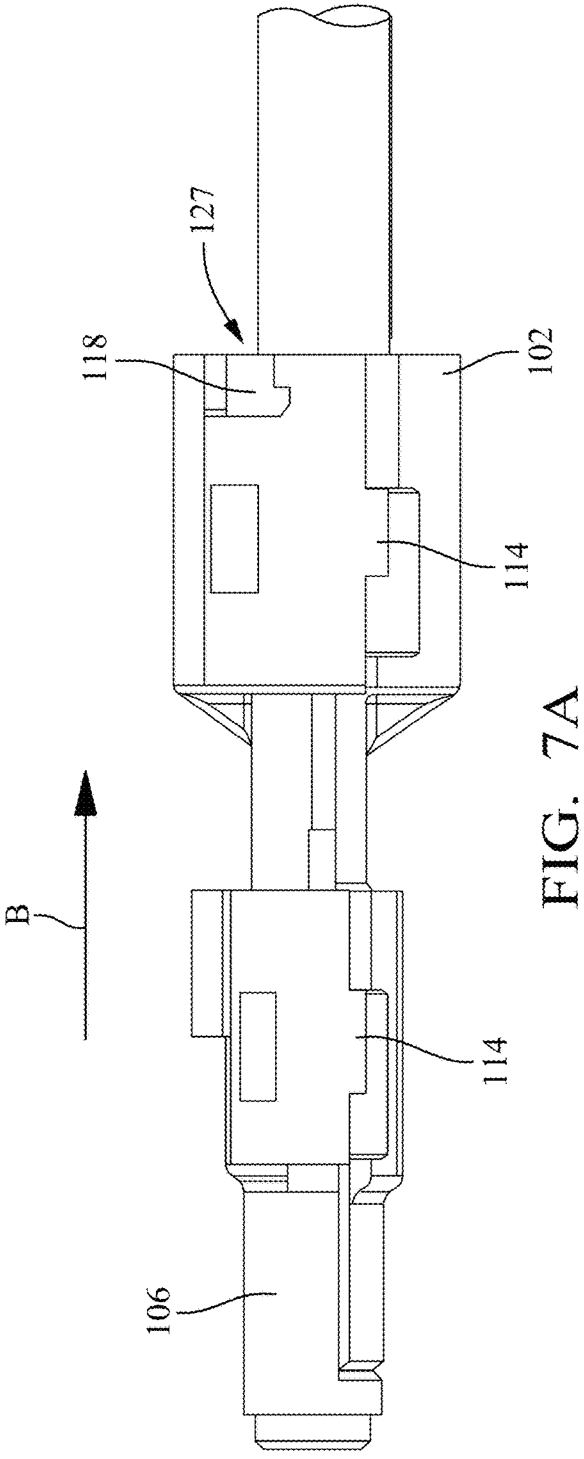
FIG. 7A is a side view of the high-speed data connector assembly in the assembled state of FIG. 4C according to an embodiment.

FIG. 7A shows a side view of the high-speed data connector assembly 100 in the assembled state of FIG. 4C. The second insulating half shell 106 is snapped onto the first insulating half shell 102 by means of the snap means 114 of the first insulating half shell 102 and the snap means 114 of the second insulating half shell 106. The second insulating half shell 106 has been shifted relative to the first insulating half shell 102 in the second direction B from the pre-locked state (see FIG. 4B) to the assembled state (see FIG. 4C). In the assembled state of the high-speed data connector assembly 100 the locking means 118 of the first insulating half shell 102 and the locking means 118 of the second insulating half shell 106 are interlocked.

Figure 7B:
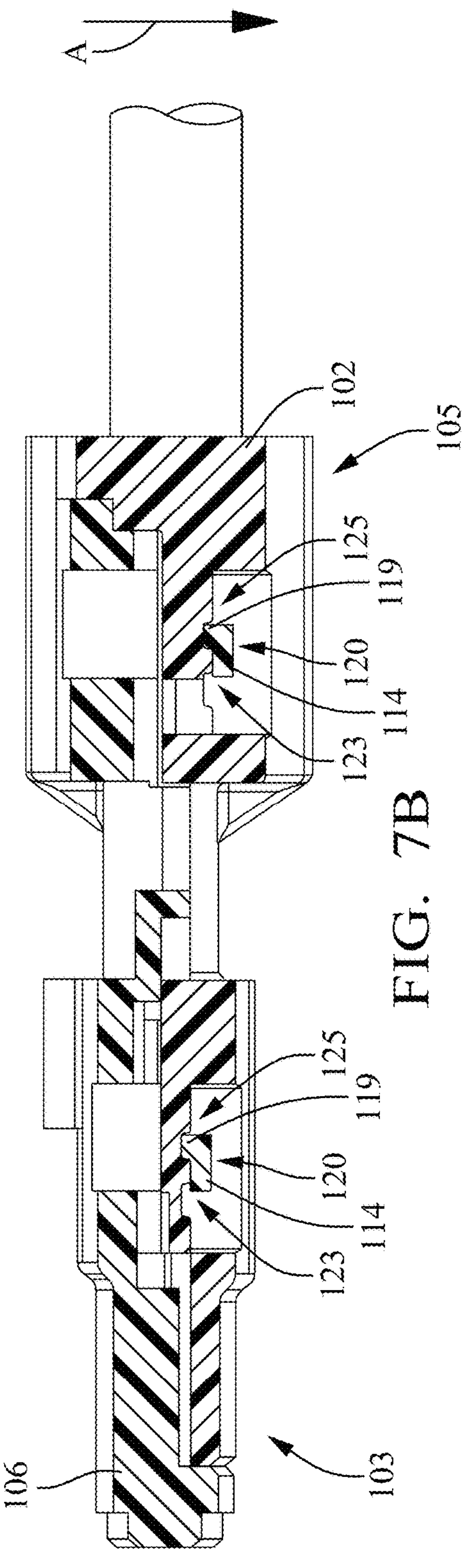
FIG. 7B is a side cross-sectional view of the high-speed data connector assembly in the assembled state of FIG. 4C according to an embodiment.

FIG. 7B shows a side cross-sectional view of the high-speed data connector assembly 100 in the assembled state of FIG. 4C. The snap means 114 of the first insulating half shell 102 and the snap means 114 of the second insulating half shell 106 are engaged. The snap means 114 of the first insulating half shell 102 includes a second gap 125. While moving the second insulating half shell 106 relative to the first insulating half shell 102 in the second direction B, the snap means 114 of the second insulating half shell 106, in particular the hook 120 (see FIG. 3A) is moved from the first gap 123 into the second gap 125 of the first insulating half shell 102. The locking means 118 of the second insulating half shell 106 that are integrated in the hook 120 of the snap means 114 of the second insulating half shell 106, in particular the bulge 119, are shifted from the first gap 123 into the second gap 125 when moving the second insulating half shell 106 in the second direction B by the sliding ramp 126 between the first section 122 and the second section 124 of the hook 120. The sliding ramp 126 is moved over an edge of the first gap 123 and, thus, lifting the bulge 119 out of the first gap 123. In the assembled state of the high-speed data connector assembly 100, the locking means 118 of the hook 120 is located in the second gap 125 of the first insulating half shell 102. In particular, the bulge 119 of the hook 120 is located in the second gap 125 of the first insulating half shell 102 in the assembled state of the high-speed data connector assembly 100.

Further, the other two of the locking means 118 of the first insulating half shell 102 that are arranged at an end of the second portion 105 of the first insulating half shell 102 are received by a slot 127 of the second insulating half shell 106 in the assembled state. Thus, the first insulating half shell 102 and the second insulating half shell 106 are locked in the first direction A and in the second direction, or axial direction A, in the assembled state. This locking means 118 of the first insulating half shell 102 and the respective slot 127 of the second insulating half shell 106 are configured to lock the first insulating half shell 102 to the second insulating half shell 106 in the second direction B when this locking means 118 of the first insulating half shell 102 is received by the slot 127 of the second insulating half shell 106. Thus, the first insulating half shell 102 and the second insulating half shell 106 are not moveable relatively to each other in the assembled state. It is understood that the first insulating half shell 102 and the second insulating half shell 106 are also not moveable in a third direction relatively to each other in the assembled state of the high-speed data connector assembly 100, wherein the third direction is a direction perpendicular to the first direction A and to the second direction B.

Figure 8A:
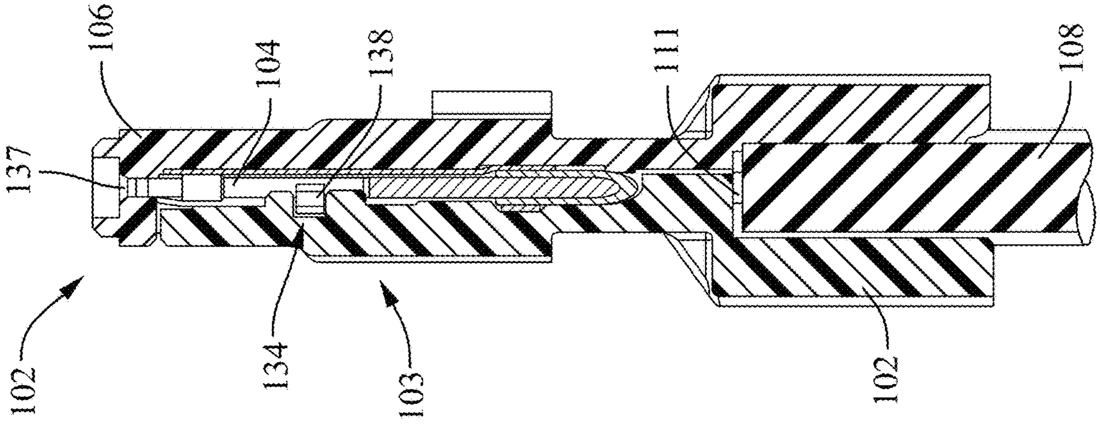
FIG. 8A is a cross-sectional view of the high-speed data connector assembly according to an embodiment.

FIG. 8A shows a cross-sectional view of the high-speed data connector assembly 100 according to an embodiment. Each of the at least two electrical terminals 104 includes a fixing element 138 configured to fix the respective electrical terminal 104 in the first insulating half shell 102 against a movement in the second direction B. The fixing element 138 is configured to be inserted in the recess 134 of the first insulating half shell 102, in particular, the fixing element 138 may be press-fitted into the recess of the first portion 103 of the first insulating half shell 102. Further, the fixing element 138 may be configured to eliminate or to reduce a rotational motion of the electrical terminals 104 around an axis defined by the second direction B, which otherwise could be present due to remaining stress in the untwisted wires 111 of the cable 108. Thus, a SI common mode performance can be boosted and a damage of a lead-in tulip 137 of the electrical terminals 104 can be prevented during the assembly of the high-speed data connector assembly 100.

The SI common mode performance may be a performance of common mode signals, wherein the signals flow through two cables 108 or two electrical conductors in the same direction and phase. When at least one of the electrical conductors 110 or signal contacts is rotated, then the cable 108 connected to that electrical conductor 110 may be out of position. That may cause an unsymmetrical cable position and, consequently, a signal on one of the cables 108 may be faster than a signal on the respective other one of the cables 108 when the signals flow through the cables 108 (common mode, or differential mode). Since each signal creates an electromagnetic wave that affects the environment of the cable 108, the signal on one of the cables 108 creates a disturbance for the signal on the respective other one of the cables 108. When the cables 108 are symmetrically positioned as described herein, this disturbance effect may be annihilated.

Figure 8B:
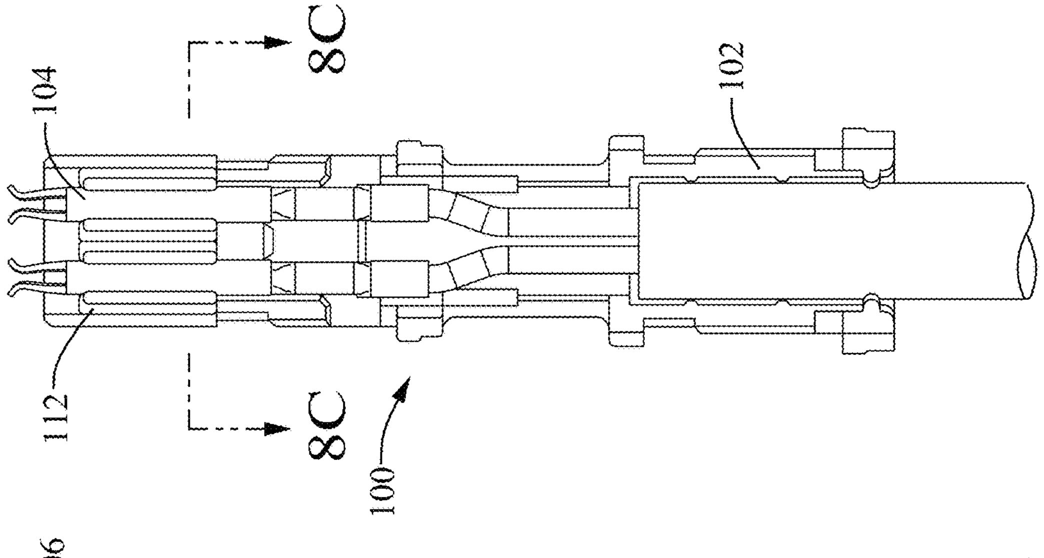
FIG. 8B is a top view of electrical terminals inserted in the clamping receptacles of the first insulating half shell of the high-speed data connector assembly according to an embodiment.
Figure 8C:
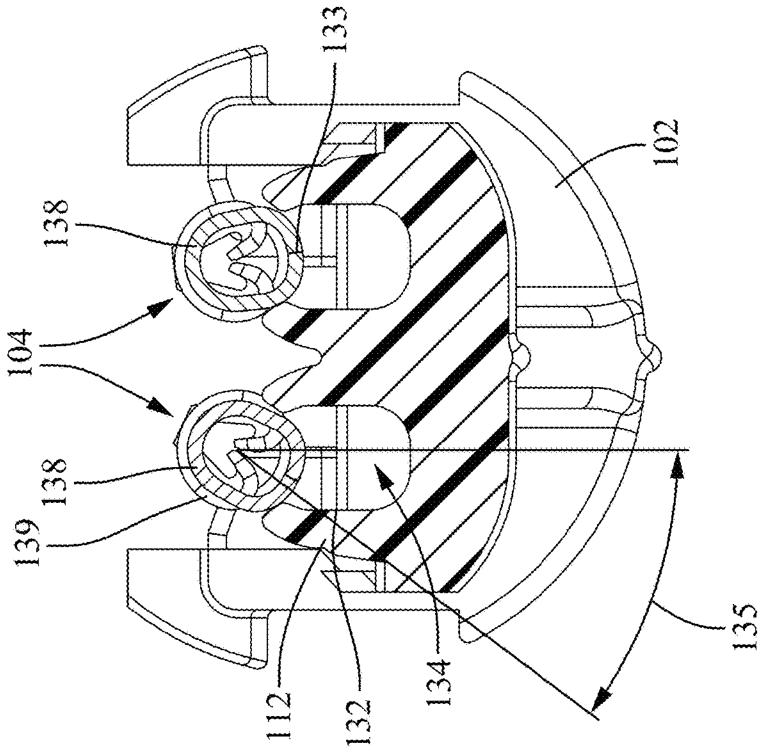
FIG. 8C is a cross-sectional view of fixing elements of the electrical terminals of FIG. 8A according to an embodiment.

FIG. 8B shows a top view of electrical terminals 104 inserted in the clamping receptacles 112 of the first insulating half shell 102 of the high-speed data connector assembly 100 according to an embodiment. FIG. 8C shows a cross-sectional view of a sectional plane W-W passing through the fixing elements 138 of the electrical terminal 104, as indicated in FIGS. 8A and 8B. The electrical terminals 104, which are connected to the electrical conductors 110 of the cable 108 (see FIG. 4A), may be inserted at an angle 135 in the clamping receptacles 112 of the first insulating half shell 102 due to stress in the twisted pair of wires 111. The angle 135 may be 0° to 45° between a vertical axis of the clamping receptacles 112 and a tangent of an outer surface of the fixing element 138 as shown in FIG. 8C. In an embodiment, the angle 135 may be 5° to 35°, preferably 10° to 20°, between a vertical axis of the clamping receptacles 112 and a tangent of an outer surface of the fixing element 138. The fixing element 138 may include a gap 133. It is understood that in another embodiment the fixing element 138 may not include a gap 133. The electrical terminals 104 may be inserted in the clamping receptacles 112 of the first insulating half shell 102 either by pressing the fixing element 138 manually into the recess 134 of the clamping receptacle 112, for example, by hand, or by pressing the fixing element 138 automatically into the recess 134 of the clamping receptacle 112 using the second insulating half shell 106 when snapping the second insulating half shell 106 onto the first insulating half shell 102. The at least two clamping receptacles 112 and/or each of the at least two electrical terminals 104 and/or each of the fixing elements 138 may include guiding surfaces 132, 139 configured to align the electrical terminals 104 and the fixing elements 138 in the clamping receptacles 112. After pressing the fixing elements 138 into the recess 134 of the clamping receptacles 112, the fixing elements 138 are arranged aligned and therefore also the electrical terminals 104 are arranged aligned in the clamping receptacles 112 of the first insulating half shell 102.

Figure 9A:
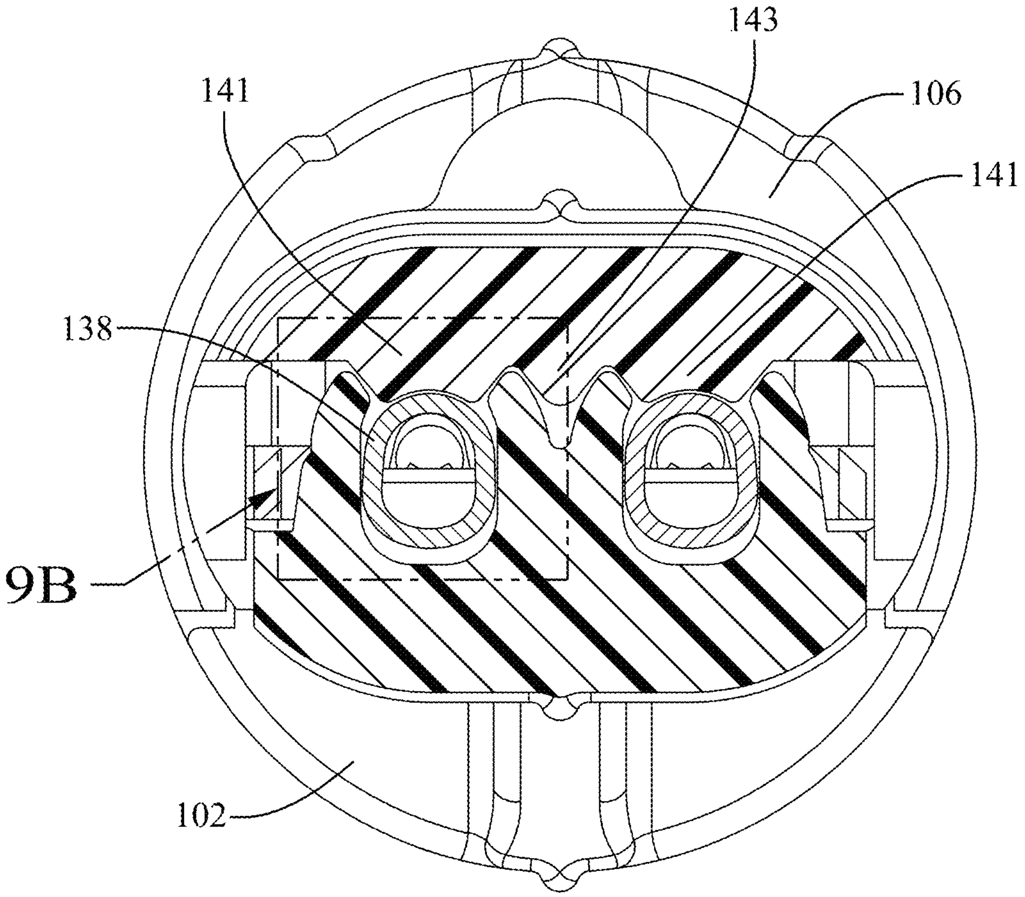
FIG. 9A is a further cross-sectional view of fixing elements of the electrical terminals in an assembled state of the high-speed data connector assembly according to an embodiment.
Figure 9B:
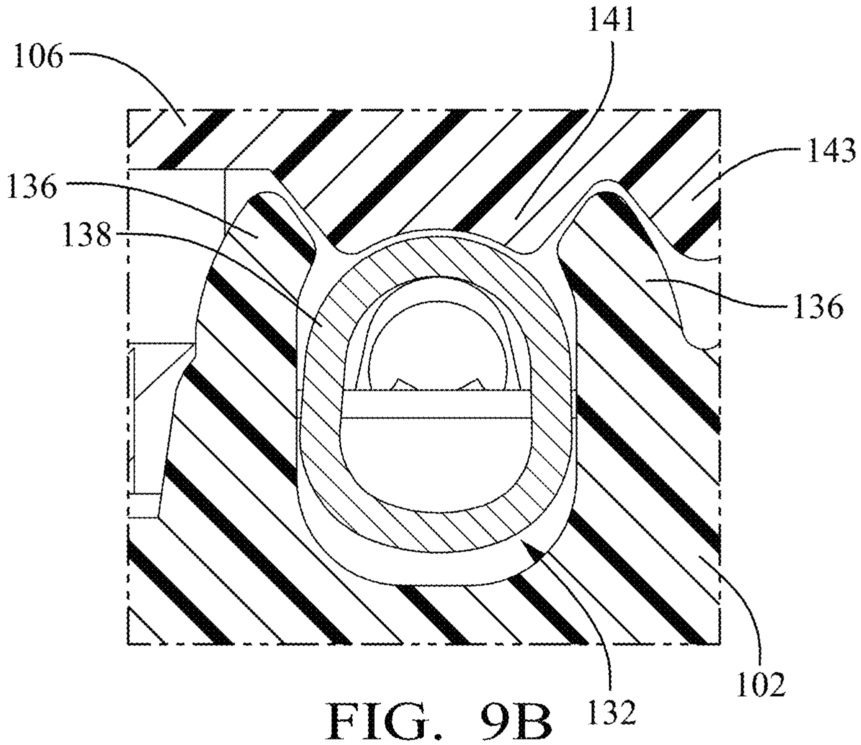
FIG. 9B is a close up cross-sectional view of the fixing elements shown in FIG. 9A according to an embodiment.

FIGS. 9A and 9B further show cross-sectional views of the fixing elements 138 of the electrical terminals 104 in an assembled state of the high-speed data connector assembly 100 according to an embodiment. The second insulating half shell 106 includes at least two protrusions 141 arranged at an inner surface of the second insulating half shell 106. The protrusions 141 are configured to press the fixing elements 138, and thus the at least two electrical terminals 104, into the at least two clamping receptacles 112, in particular into the recesses 134 of the clamping receptacles 112, when the second insulating half shell 106 is moved in the first direction A. The second insulating half shell 106 further includes at least one wedge 143 arranged at the inner surface of the second insulating half shell 106. The wedge 143 is configured to press the at least one wall 136 of each clamping receptacle 112 in a direction towards the electrical terminal 104 or towards the fixing element 138 inserted in the respective clamping receptacle 112 when the second insulating half shell 106 is moved in the first direction A.

Figure 10A:
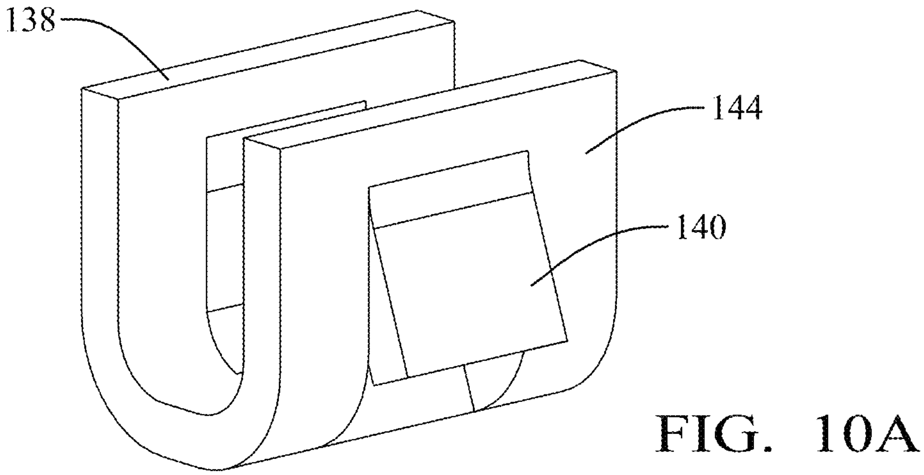
FIG. 10A is an isometric view of a fixing element having clamping elements according to an embodiment.
Figure 10B:
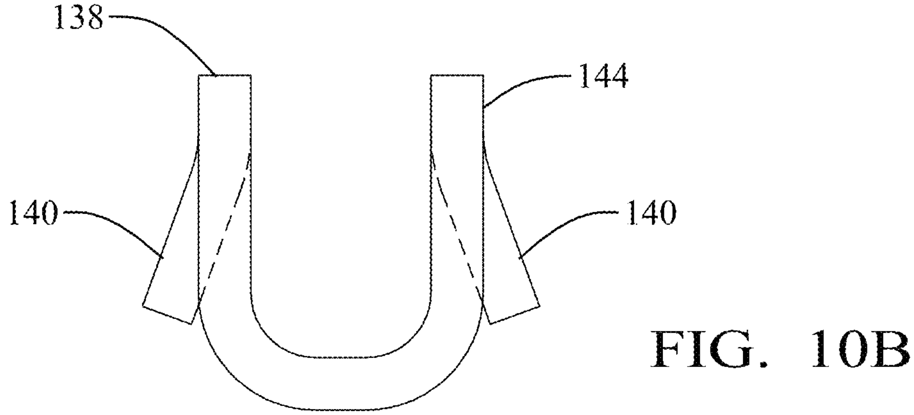
FIG. 10B is a side view of the fixing element of FIG. 10A according to an embodiment.
Figure 10C:
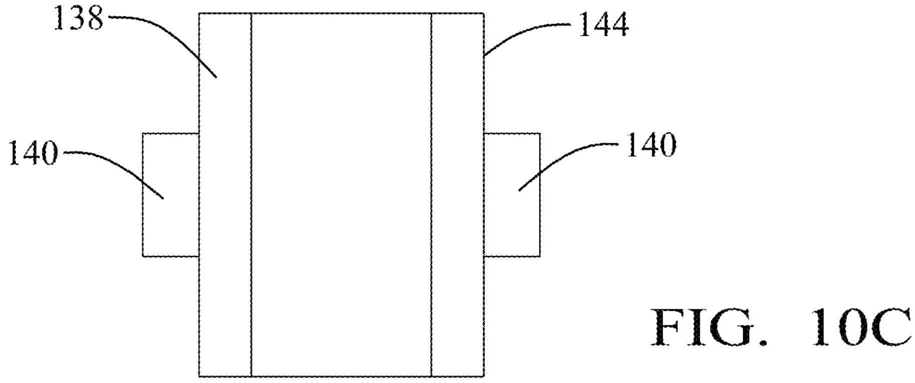
FIG. 10C is a top view of the fixing element of FIG. 10A according to an embodiment.

FIG. 10A shows an isometric view of a fixing element 138 having clamping elements according to an embodiment. FIG. 10B shows a side view and FIG. 10C shows a top view of the fixing element of FIG. 10A. The fixing element 138 includes at least one clamping element arranged at an outer surface 144 of the fixing element 138. The clamping element may be a bent tongue 140. The tongue 140 is bent in a radial direction outwards the fixing element 138. The tongue is formed from the fixing element 138 itself, i.e., a part of the outer surface 144 of the fixing element 138 and is bent outwards such that this part forms the tongue 140. The tongue 140 is configured to fix the fixing element 138, and thus the respective electrical terminal 104 in the respective clamping receptacle 112.

Figure 11A:
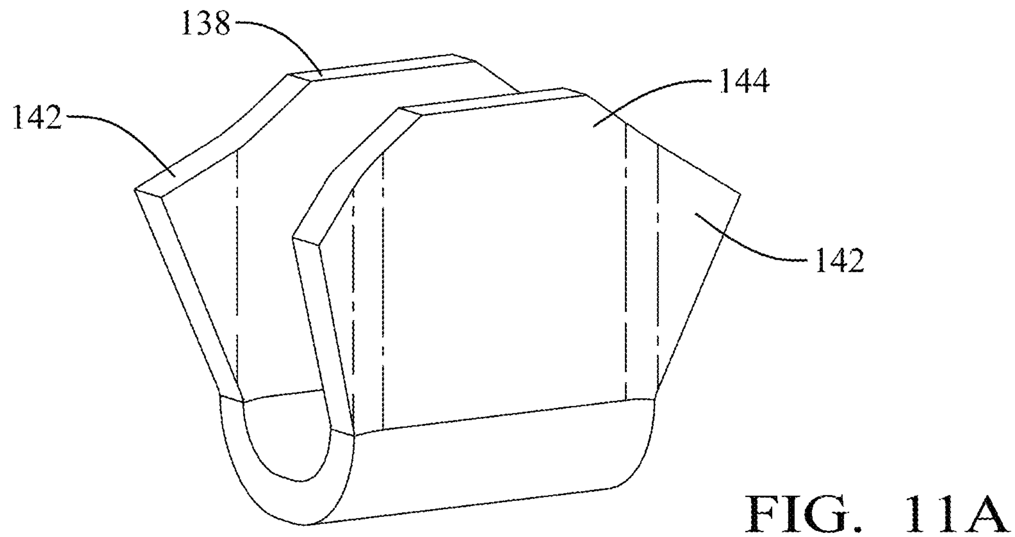
FIG. 11A is an isometric view of a fixing element having clamping elements according to another embodiment.
Figure 11B:
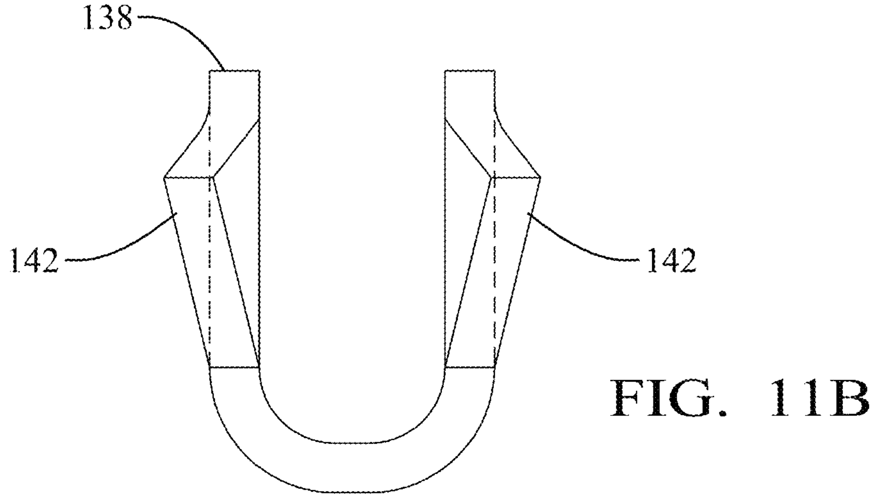
FIG. 11B is a side view of the fixing element of FIG. 11A according to an embodiment.
Figure 11C:
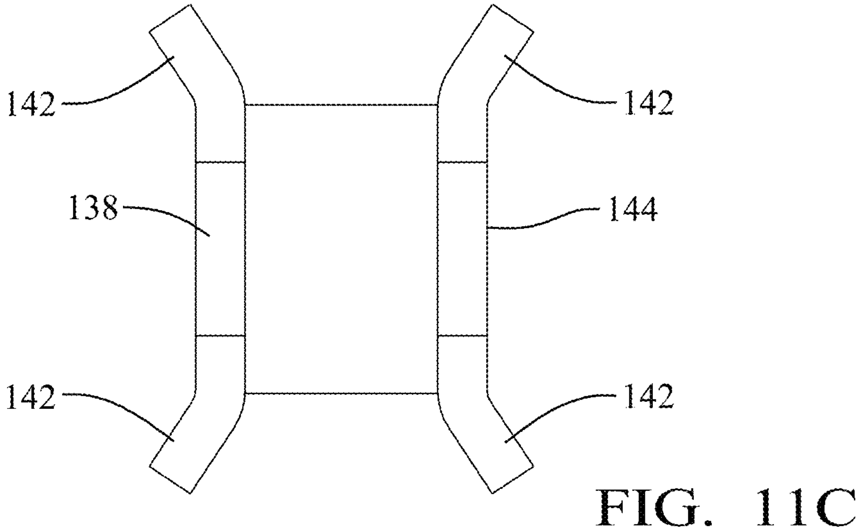
FIG. 11C is a top view of the fixing element of FIG. 11A according to an embodiment.

FIG. 11A shows an isometric view of a fixing element 138 having clamping elements according to another embodiment. FIG. 11B shows a side view and FIG. 11C shows a top view of the fixing element 138 of FIG. 11A. The fixing element 138 of this embodiment includes at least one clamping element arranged at an outer surface 144 of the fixing element 138. The clamping element may be a bent edge 142. The edge 142 is bent in a radial direction outwards the fixing element 138. The edge is formed from the fixing element 138 itself, i.e., a part of the outer surface 144 of the fixing element 138 is bent outwards such that this part forms the edge 142. The edge 142 is configured to fix the fixing element 138, and thus the respective electrical terminal 104 in the respective clamping receptacle 112.

Figure 12:
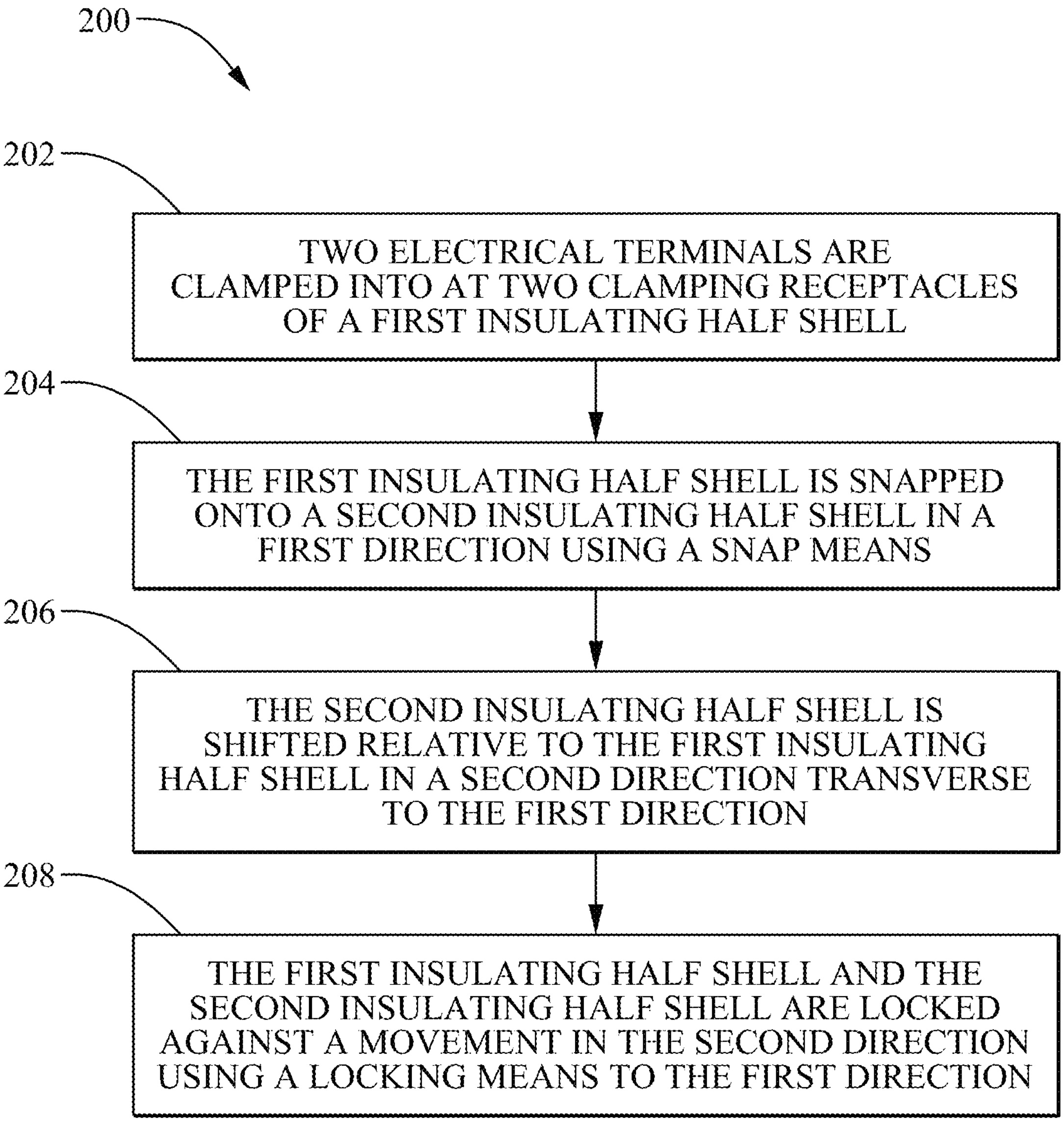
FIG. 12 is a flow diagram illustrating a method for assembling a high-speed data connector assembly according to an embodiment.

FIG. 12 shows a flow diagram 200 illustrating a method for assembling a high-speed data connector assembly 100 according to various embodiments. At 202, at least two electrical terminals 104 may be clamped into at least two clamping receptacles 112 of a first insulating half shell 102. At 204, the first insulating half shell 102 may be snapped onto a second insulating half shell 106 in a first direction A using a snap means 114. At 206, the second insulating half shell 106 may be shifted relative to the first insulating half shell 102 in a second direction B transverse to the first direction A. At 208, the first insulating half shell 102 and the second insulating half shell 106 may be locked against a movement in the second direction B using locking means 118.

While this invention has been described in terms of the preferred embodiments thereof, it is not intended to be so limited, but rather only to the extent assembly forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, ‘one or more’ includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms “a”, “an” and “the” are intended to include the plural forms as well, unless the context clearly indicates otherwise. It will also be understood that the term “and/or” as used herein refers to and encompasses all possible combinations of one or more of the associated listed items. It will be further understood that the terms “includes,” “including,” “includes,” and/or “including,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context. Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A high-speed data connector assembly, comprising:

a first insulating half shell having at least two clamping receptacles;

at least two electrical terminals inserted in the clamping receptacles;

a second insulating half shell complementary to the first half shell;

snap means configured to snap the first insulating half shell onto the second insulating half shell in a first direction while still allowing a shifting of the second insulating half shell relative to the first insulating half shell in a second direction transverse to the first direction; and locking means configured to lock the first insulating half shell and the second insulating half shell against a movement in the second direction.

2. The high-speed data connector assembly according to claim 1, wherein the snap means are located at an outer circumferential wall of the first insulating half shell and the second insulating half shell.

3. The high-speed data connector assembly according to claim 1, wherein the snap means comprises at least one hook and at least one ledge configured to define an overlap between the at least one hook and the at least one ledge when snapped in place, wherein the overlap increases when shifting the second insulating half shell relative to the first insulating half shell in the second direction.

4. The high-speed data connector assembly according to claim 3, wherein the at least one hook comprises a first section and a second section connected by means of a sliding ramp.

5. The high-speed data connector assembly according to claim 3, wherein the locking means are integrated in the at least one hook.

6. The high-speed data connector assembly according to claim 1, wherein the locking means are located at an outer circumferential wall of the first insulating half shell and the second insulating half shell.

7. The high-speed data connector assembly according to claim 1, wherein electrical conductors are connected to the electrical terminals and wherein the first insulating half shell and/or the second insulating half shell comprises a rib configured to separate the electrical conductors.

8. The high-speed data connector assembly according to claim 7, wherein the rib substantially completely fills a space between the two electrical conductors in an assembled state of the high-speed data connector assembly.

9. The high-speed data connector assembly according to claim 1, wherein each of the at least two electrical terminals comprises a fixing element configured to fix the respective electrical terminal in the first insulating half shell against a movement in the second direction).

10. The high-speed data connector assembly according to claim 9, wherein each of the at least two clamping receptacles and/or each of the at least two electrical terminals and/or each of the fixing elements comprise guiding surfaces configured to align the electrical terminals and the fixing elements in the clamping receptacles.

11. The high-speed data connector assembly according to claim 9, wherein the second insulating half shell comprises at least two protrusions arranged at an inner surface of the second insulating half shell and configured to press the fixing elements, and thus the at least two electrical terminals, into the at least two clamping receptacles when the second insulating half shell is moved in the first direction.

12. The high-speed data connector assembly according to claim 11, wherein the second insulating half shell comprises at least one wedge arranged at the inner surface of the second insulating half shell and configured to press at least one wall of each clamping receptacle in a direction towards the electrical terminal inserted in the respective clamping receptacle when the second insulating half shell is moved in the first direction.

13. The high-speed data connector assembly according to claim 9, wherein each of the fixing elements comprises at least one clamping element arranged on an outer surface of each of the fixing elements and configured to fix each of the fixing elements, and thus each of the respective electrical terminal in the respective clamping receptacle.

14. The high-speed data connector assembly according to claim 13, wherein the at least one clamping element comprises a bent tongue or a bent edge.

15. The high-speed data connector assembly according to claim 1, wherein the high-speed data connector assembly comprises at least four snap means and at least six locking means.

16. A method for assembling a high-speed data connector assembly having a first insulating half shell having at least two clamping receptacles, at least two electrical terminals inserted in the clamping receptacles, a second insulating half shell complementary to the first half shell, snap means configured to snap the first insulating half shell onto the second insulating half shell in a first direction while still allowing a shifting of the second insulating half shell relative to the first insulating half shell in a second direction transverse to the first direction and locking means configured to lock the first insulating half shell and the second insulating half shell against a movement in the second direction, comprising:

clamping the at least two electrical terminals into the at least two clamping receptacles of the first insulating half shell;

snapping the first insulating half shell onto the second insulating half shell in the first direction using the snap means;

shifting the second insulating half shell relative to the first insulating half shell in the second direction) transverse to the first direction; and locking the first insulating half shell and the second insulating half shell against a movement in the second direction) using the locking means.

* * * * *